United States Patent [19]
Maier et al.

[11] Patent Number: 6,137,871
[45] Date of Patent: Oct. 24, 2000

[54] TELECOMMUNICATION DEVICE WITH CALLER IDENTIFICATION

[75] Inventors: Wolfgang Maier, Langen; Ruediger Winter, Riedstadt; Wolfgang Kiesewetter, Frankfurt, all of Germany

[73] Assignee: Robert Bosch GmbH, Stuttgart, Germany

[21] Appl. No.: 08/999,187

[22] Filed: Dec. 9, 1997

[30] Foreign Application Priority Data

Dec. 11, 1996 [DE] Germany .............................. 196 51 383

[51] Int. Cl.[7] .............................. H04M 1/56; H04M 15/06
[52] U.S. Cl. ........................ 379/142; 379/93.17; 379/157
[58] Field of Search .................................... 379/127, 142, 379/93.03, 93.27, 93.23, 157, 164, 165, 242, 245, 247, 93.17

[56] References Cited

U.S. PATENT DOCUMENTS 5,267,307  11/1993  Izumi et al. .............................. 379/354
5,546,447   8/1996  Skarbo et al. ........................... 379/142
5,832,072  11/1998  Rozenblit ................................. 379/246

OTHER PUBLICATIONS

"Telefonieren Plus PC–Komfort. Bosch Ontegral + Phone UND IHR PC", Bosch, Telenorma GmbH.

Primary Examiner—Curtis A. Kuntz
Assistant Examiner—Binh K. Tieu
Attorney, Agent, or Firm—Michael J. Striker

[57] ABSTRACT

A telecommunication device (1) is provided for identification of a caller number of a calling party. The telecommunication device (1) includes a caller identification circuit (5), a memory (10) for storing numbers of callers and a comparator (15) for comparing numbers of calling parties with the caller numbers stored in the memory. The telecommunication device supplies data of the calling party to a display device when the caller number of a calling party agrees with a caller number stored in memory. A truncation of the caller number of the calling party at its end by a predetermined number of digits occurs when there is no agreement between the caller number of the calling party and any of the numbers stored in the memory and a comparison of the branch exchange main numbers stored in the memory with the shortened caller number occurs.

4 Claims, 2 Drawing Sheets

TELECOMMUNICATION DEVICE WITH CALLER IDENTIFICATION

BACKGROUND OF THE INVENTION

The present invention relates to a telecommunication device with a caller identification device and, more particularly, to a telecommunication device with a caller identification device for a number of a calling party, a memory for the numbers of various calling parties, a comparator for comparing the caller number of the calling party with caller numbers stored in memory and a display device for displaying the number of the calling party when that number agrees with one of the numbers stored in the memory.

A telecommunication device of this type is known and described in the product publication, "Telephoning plus PC Comfort. Bosch Integral+Phone and Your PC", in which the appropriate information data is displayed together with other data in ISDN at the same time with the incoming call.

SUMMARY OF THE INVENTION

It is an object of the present invention to provide an improved telecommunication device of the above-described kind for caller identification.

This object, and others which will be made more apparent hereinafter, are attained in a telecommunication device comprising a caller identification device for the number of a calling party, memory means for storing the numbers of various calling parties, a comparing means for comparing the caller number of the calling party with caller numbers stored in the memory and display means for displaying the number of the calling party when that number agrees with one of the numbers stored in the memory.

According to the invention, the telecommunication device further comprises means for truncating the caller number of the calling party at its end by a predetermined number of digits when the caller number does not agree with any of the numbers stored in the memory and means for comparing the truncated number with branch exchange main numbers stored in memory.

The telecommunication device according to the invention has the advantage that the branch exchange main number can be correlated to data in the telecommunication device, which can then be displayed independently of the number of the calling party connected to the branch exchange. In this way a simple and definite identification of the branch exchange is possible independently of the number of the calling party connected to the branch exchange, which can occur especially rapidly since there are fewer digits to compare with the branch extension main number than with the complete number.

An additional advantage is that calling parties or subscribers connected to a branch exchange, whose data do not differ from each other, are not correlated to appropriate individual data statements in the telecommunication device, but can be correlated to a standard data statement corresponding to a branch exchange main number of a calling party, whereby memory locations are eliminated from the telecommunication device. One such case occurs, for example, when a calling party does not call from his own subscriber unit connected to the branch exchange, but for example from another subscriber or calling device connected to the branch exchange in a conference room, or when this calling party is represented by another calling party whose subscriber or calling device is similarly connected to the branch exchange.

Advantageous additional features and improvements of the telecommunication device according to the invention are described in the dependent claims appended hereinbelow.

It is advantageous when a data statement is correlated with several caller numbers deposited in memory. In this way a calling party can be characterized by a single data statement in a memory saving manner, also independently of connection to a branch exchange. This is for example of significance when a calling party calls the telecommunication device partially over a branch exchange unit and partially over an end unit not connected to the branch exchange, as for example a mobile telephone. On the other hand, extensions of a branch exchange can be combined into a group that is associated with a common data statement. An especially flexible assignment of data statements to caller numbers of calling parties is possible.

It is also advantageous to store caller numbers in memory which are extension numbers which are correlated to the predetermined number of truncated digits and which are stored similarly in the telecommunication device. In this way the number to be compared with the caller number for determination of the extension main number can be determined in a simple and rapid manner in the telecommunication device.

BRIEF DESCRIPTION OF THE DRAWING

The objects, features and advantages of the invention will now be explained in more detail in the following detailed description of the preferred embodiments, in which.

DESCRIPTION OF THE REFERRED EMBODIMENTS

Figure 1:
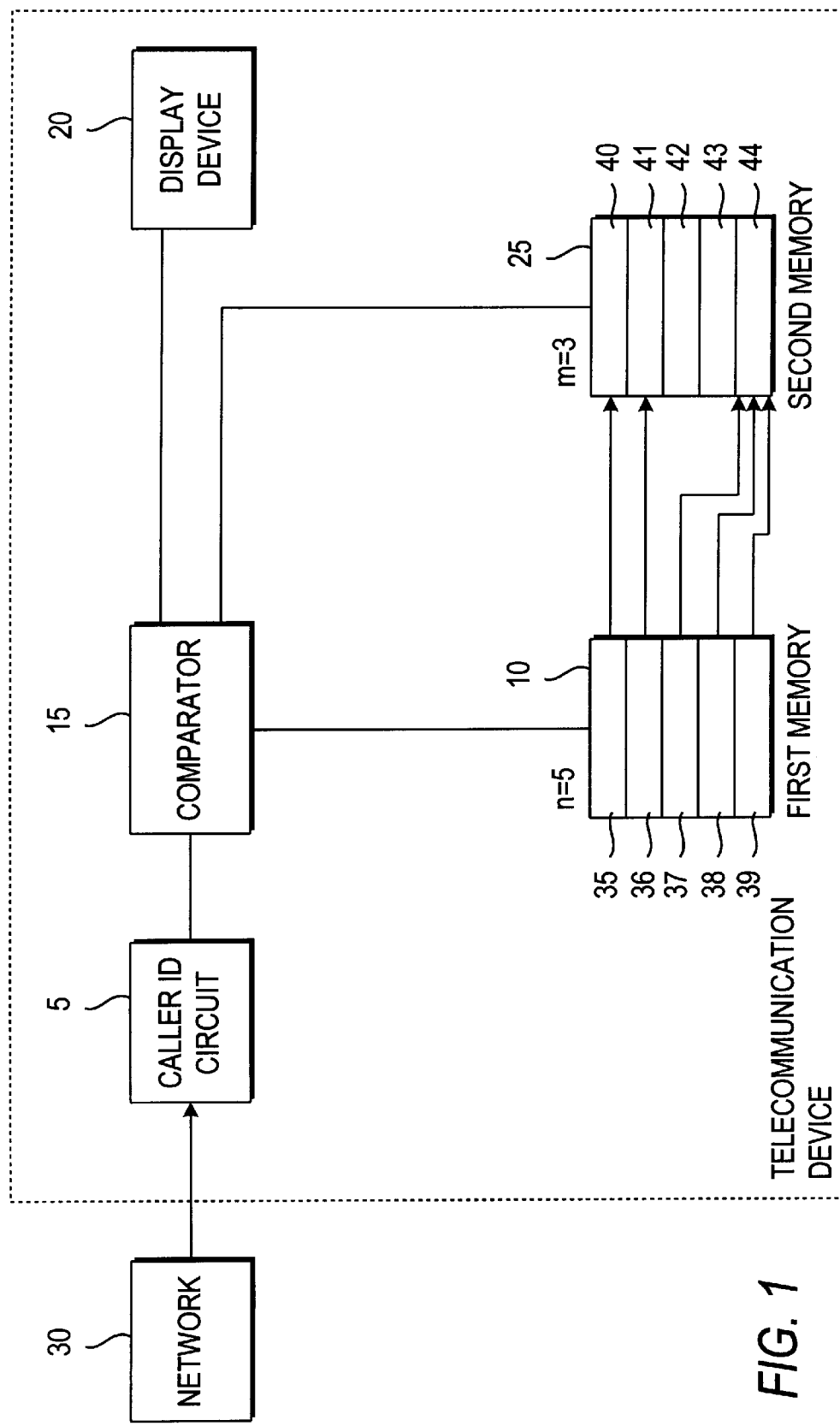
FIG. 1 is a block diagram of a telecommunication circuit according to the claimed invention.

A telecommunication device 1 connected to a telecommunication network 30 is shown in FIG. 1. The telecommunication device 1 includes a caller identification circuit 5, which is connected with the telecommunication network 30 and a comparator 15 of the telecommunication device 1 connected to it. The telecommunication device 1 also includes a first memory 10 with n memory locations connected to the comparator 15, which are assigned to m memory locations of a second memory 25 connected with the comparator 15. The telecommunication device 1 also has a display device 20, which is likewise connected to the comparator 15.

The first memory 10 includes n=5 memory locations 35, 36, . . . , 39 and the second memory 25 includes m=3 memory locations 0, 1 and 2. Thus the first memory location 40 of the second memory 25 is associated or correlated with the first memory location 35 of the first memory 10. The second memory location 41 of the second memory 35 is associated with the second memory location 36 of the first memory 10. The remaining memory locations 37, 38 and 39 of the first memory 10 are associated with the third memory location 42 of the second memory 25. At least one caller number of a calling party or subscriber of the telecommunication network 30 is stored in the memory locations 35, 35, . . . , 39 of the first memory 10 and data for this calling party or subscriber of the telecommunication network 30 in the form of at least one data statement is stored in the memory locations 40, 41, 42 of the second memory 25. The choice of the number of the memory locations in the first and in the second memories 10,25 is for the purposes of providing an example and also may be different according to the requirements of the particular application involved. The same goes for the correlation of the memory locations 40, 41, 42 of the second memory 25 to the memory locations 35, . . . , 39 of the first memory 10. As can be seen from FIG. 1, the second memory 25 has two unoccupied memory locations 43,44, which can be eliminated or can be occupied in the case of other selected correlations of the memory locations 40, . . . , 44 of the second memory 25 to the memory locations 35, . . . , 39 of the first memory 10. The associated data statement in the appropriate memory location of the second memory 25 also contains the number of the digits of the caller number connected with the extension main number in the case of storing an extension main number. The assignment of the data statement in the second memory 25 to the caller number in the first memory 10 is completely arbitrary and can for example be set by an unshown input unit of the telecommunication device 1 by the user. The data statement can, for example, be assigned a complete caller number, an extension main number without main number digits, several complete caller numbers, several extension main numbers without main number digits or the like.

On using the telecommunication device 1 in a business firm the memory locations 40, . . . , 44 of the second memory 25 can be occupied by information data statements by means of an unshown input device. Thus it can be important with a customer who has a branch exchange to store the extension main number of a customer by means of the unshown input device in a memory location of the first memory 10 and to deposit the number of the calling number digits associated with the extension main number as an information data statement in an associated memory location of the second memory 25, so that on calling in on an arbitrary extension by the customer the associated data statement in the second memory 25 can be retrieved by means of the extension main number in the first memory 10. However several customer data statements can be guided to a customer firm, so that an information data statement in the second memory 25 can be exactly associated with several caller numbers of this firm in the first memory 10. One such data statement out of several extensions of a branch exchange also cannot be correlated to the to the subscriber unit connected to the branch exchange, for example with mobile telephones. An extension main number can be stored in a memory location of a first memory in the form of a complete caller number that also contains the number of the extension digits associated with the extension main number. If the telecommunication device 1 receives a call from one extension of the same branch exchange however with a different caller number, which is not stored in the first memory 10, this caller number is thus not identified with the caller number stored in the first memory 10. The number of the caller number digits connected with the extension main number is then determined from the second memory 25 in a second comparison and the last digits of the caller number being compared are not analyzed according to the accordingly the determined number. In this way the branch exchange associated with the complete caller number is identified. The possibility also exists to correlate the complete calling number in the first memory location in the second memory 25 and the associated exchange main number in a second memory location in the second memory 25, whereby the address of the second memory location is added to the data statement in the first memory location, so that a suitable correlation of this second memory location for the branch exchange main number can also be performed with a second comparison. Otherwise the addresses for the correlation of the memory locations 35, . . . , 39 of the first memory 10 to the appropriate memory locations 40, . . . , 44 of the second memory 25 are stored in the appropriate memory locations 35, . . . , 39 of the first memory 10 in addition to the caller number. In this way after identification of the caller number of a calling subscriber the memory locations 40, . . . , 44 of the second memory 25 are accessible. When an extension main number in the first memory 10 contained in a complete caller number, which is correlated with an additional data statement in the second memory 25, is identified in a second comparison according to the above-described method, the correlation of the extension main number to this additional data statement occurs by means of the addresses in the second memory added to the data statement associated with the complete extension main number. In this way the truncation required for the second comparison determines the number of extension digits from the second memory 25 because of the addressing stored in the first memory.

Figure 2:
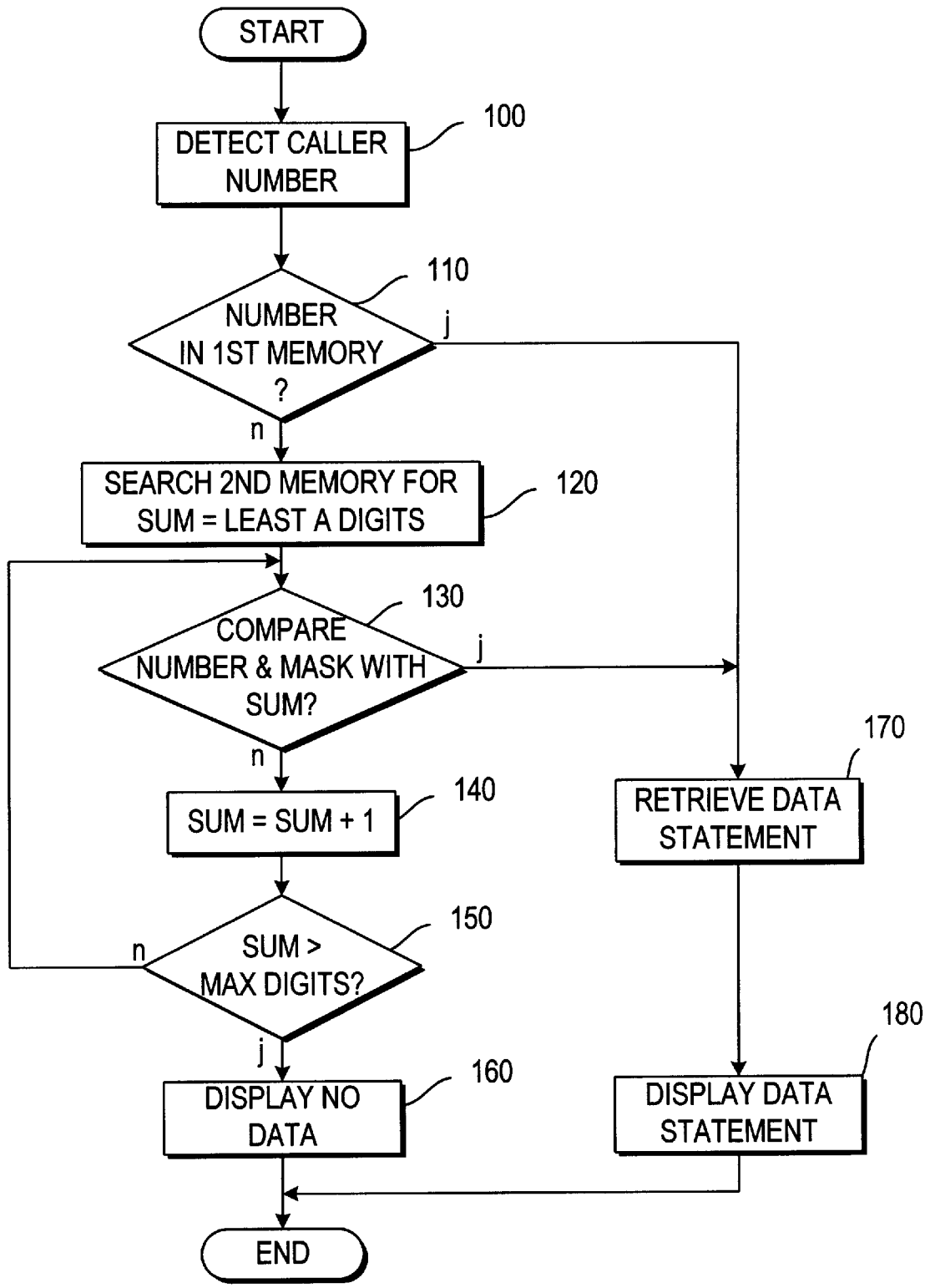
FIG. 2 is a flow chart showing a process for caller number comparison.

The process for retrieving the data statements of the second memory 25 belonging to the caller number of the calling party by the comparator 15 is shown in FIG. 2 with the aid of a flow chart.

At the starting step 100 of the process a caller number of a calling party calling the telecommunication system transmitted from the telecommunication network 30 to the caller identification circuit 5 is detected and conducted to the comparator 15. In the program step 110 the comparator tests whether the detected caller number is stored in one of the memory locations 35, . . . , 39 of the first memory 10. If this is the case, the program branches to program step 170, otherwise it branches to program step 120. The memory locations 40, . . . , 44 of the second memory 25 assigned to the memory locations 35, . . . , 39 of the first memory 10 according to the addresses stored there are searched for the stored numbers of the caller number digits in program step 120. If these numbers are stored in the appropriate memory locations of the second memory 25, the smallest number a is determined. In program step 130 a comparison between the caller number detected in the caller identification circuit 5 and the caller number in the memory locations 35, . . . , 39 of the first memory 10 takes place, wherein the last a digits are not considered. If this comparison is successful, the program branches to program step 170, in the other case it branches to program step 140. The number a is incremented by 1 in program step 140. Program step 150 tests whether or not the new number a in the second memory 25 is greater than the maximum number of caller number digits stored in the second memory 25. If this is the case, the program branches to program step 160, otherwise it branches back to program step 120. The data statement associated with the identified caller number from the second memory 25 is retrieved at program step 170 and is fed to the comparator 15 of the display device 20 for display. The display of the retrieved statement occurs at program step 180 in the display device 20. At program step 160 the user transmits to the display device 20 that no data statement is stored in the second memory 25 for the caller number of the calling party. The program ends at program step 160 or program step 180.

The telecommunication device 1, for example, can be used in the telemarketing profession, in the purchasing business and in service professions. Rapid access to stored customer data for processing customer wishes is required in these areas. Thus the data of the telephone caller are still available prior to taking the call, since the caller number of the calling party is already transmitted during the calling process to the telecommunication device 1. The transmission and/or signaling of the caller number in the telecommunication device 1 can occur digitally, for example with ISDN, or also in an analog fashion.

The same invention as described hereinabove is also described in German Patent Application 196 51 383.9 of Dec. 12, 1996, which is hereby explicitly incorporated here by reference. This German Patent application forms the basis for a claim of priority under 35 U.S.C. 119 for the instant invention described herein.

We claim:

1. A telecommunication device (1) comprising a caller identification device (5) for a caller number of a calling party, memory means (10) for storing a plurality of numbers of various calling parties, comparing means (15) for comparing the caller number of the calling party with numbers stored in the memory means (10), display means (20) for displaying data correlated with the caller number of the calling party when said caller number agrees with one of the numbers stored in the memory means (10), means for truncating the caller number of a calling party by a predetermined number of digits at an end thereof when the caller number does not agree with any of the numbers stored in the memory means (10) and means for comparing a truncated number formed by the truncating with private branch exchange main numbers stored in the memory means (10).

2. The telecommunication device as defined in claim 1, further comprising means for correlating a single data statement to a plurality of the numbers stored in the memory means (10).

3. The telecommunication device as defined in claim 1, wherein stored numbers which are extension numbers are correlated with the predetermined number of digits that is similarly stored in the telecommunication device (1).

4. A telecommunication device (1) comprising
a caller identification device (5) for identifying a caller number of a calling party;
memory means (10) for storing a plurality of numbers of various calling parties and a predetermined number (a) of digits of said numbers for truncation of said numbers;
comparing means (15) for comparing the caller number of the calling party with said numbers stored in the memory means (10);
display means (20) for displaying data correlated with the caller number of the calling party or a part of said caller number when said caller number or said part of said caller number agrees with one of said numbers or a corresponding part of said numbers stored in the memory means (10);
means for truncating the caller number of the calling party by a number of truncating digits thereof to form a truncated number when the caller number does not agree with any of the numbers stored in the memory means (10) according to said comparing means (15);
means for comparing the truncated number with correspondingly truncated numbers formed by truncating the numbers stored in the memory means (10) by a number of truncating digits specific to said numbers stored in said memory means; and
means for increasing said number of truncating digits by one to form an increased number of truncating digits and repeating said truncating of said caller number of the calling party with said increased number of truncating digits to form a further truncated number and repeating said comparing by said means for comparing with the further truncated number until either the number of truncating digits exeeds the predetermined number (a) of digits for truncation or the number of the calling party is found.

* * * * *